(12) United States Patent
Yuyama

(10) Patent No.: US 8,792,019 B2
(45) Date of Patent: Jul. 29, 2014

(54) VIDEO CREATION DEVICE, VIDEO CREATION METHOD AND NON-TRANSITORY COMPUTER-READABLE STORAGE MEDIUM

(75) Inventor: Masami Yuyama, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/487,658

(22) Filed: Jun. 4, 2012

(65) Prior Publication Data

US 2012/0307102 A1    Dec. 6, 2012

(30) Foreign Application Priority Data

Jun. 6, 2011    (JP) ................... 2011-126498

(51) Int. Cl.
*H04N 5/262*    (2006.01)
*H04N 5/225*    (2006.01)
*H04N 5/228*    (2006.01)
*G06K 9/00*    (2006.01)
*G06K 9/32*    (2006.01)

(52) U.S. Cl.
USPC ............. 348/239; 348/218.1; 348/222.1; 382/116; 382/300

(58) Field of Classification Search
CPC .................. H04N 5/2355; H04N 5/35536
USPC ........ 348/239, 222.1, 571, E05.031, E05.062
See application file for complete search history.

(56) References Cited

U.S. PATENT DOCUMENTS 7,301,563 B1    11/2007    Kakinuma et al.
7,755,664 B2     7/2010    Kakinuma et al.
2007/0159538 A1    7/2007    Kakinuma et al.
2007/0229698 A1    10/2007    Kakinuma et al.
2008/0219585 A1*    9/2008    Kasai et al. .................. 382/274
2010/0271512 A1*   10/2010    Garten .......................... 348/239

(Continued)

FOREIGN PATENT DOCUMENTS

CN    101867727 A    10/2010
CN    101917551 A    12/2010

(Continued)

OTHER PUBLICATIONS

Chinese Office Action dated Mar. 3, 2014 (and English translation thereof) in counterpart Chinese Application No. 201210182706.5.

*Primary Examiner* — Nhan T Tran
*Assistant Examiner* — Chan Nguyen
(74) *Attorney, Agent, or Firm* — Holtz Holtz Goodman & Chick PC

(57) ABSTRACT

In a video creation device, a creator creates a frame of a first type and a frame of a second type. A difference determiner determines whether or not the difference between frames of a determination pair exceeds a threshold, wherein the determination pair contains two frames of the first type, or the frame of the first type and the frame of the second type. A frame creator creates a frame of a third type between frames of a data pair, wherein the data pair contains two frames of the first type next to each other. A synthesizer creates high-dynamic-range frame by synthesizing frames of synthesized pair, wherein synthesized pair contains the frame of the second type and the frame of the first type, or the frame of the second type and the frame of third type. And, a video creator creates video comprised of the frame synthesized by the synthesizer.

8 Claims, 3 Drawing Sheets

(56) References Cited

U.S. PATENT DOCUMENTS

| | | | |
|---|---|---|---|
| 2010/0295954 A1* | 11/2010 | Kotani | 348/208.4 |
| 2011/0292243 A1* | 12/2011 | Nagataki et al. | 348/229.1 |
| 2012/0033131 A1 | 2/2012 | Chen et al. | |

FOREIGN PATENT DOCUMENTS

| | | |
|---|---|---|
| EP | 0 977 432 A2 | 2/2000 |
| JP | 2007-274285 A | 10/2007 |
| JP | 2008-099158 A | 4/2008 |

* cited by examiner

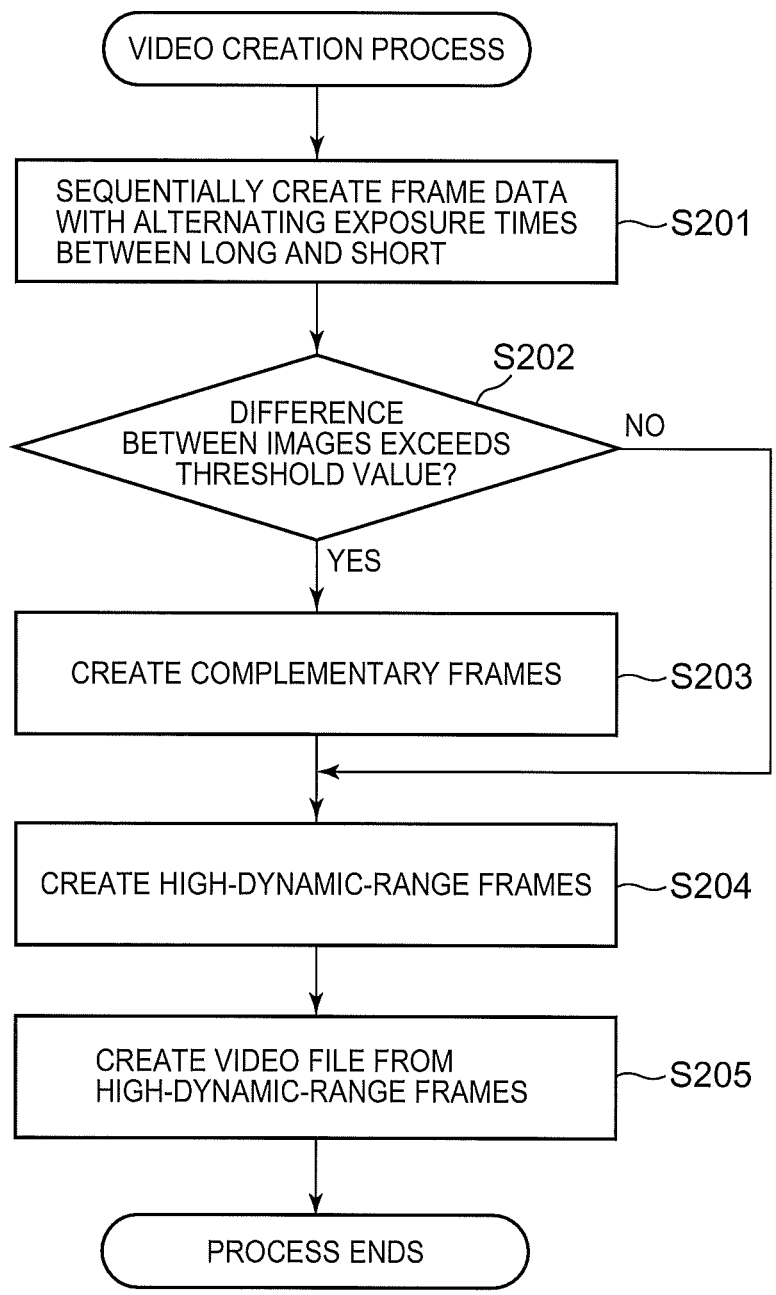

VIDEO CREATION DEVICE, VIDEO CREATION METHOD AND NON-TRANSITORY COMPUTER-READABLE STORAGE MEDIUM

CROSS-REFERENCE TO RELATED APPLICATION

This application claims the benefit of Japanese Patent Application No. 2011-126498, filed Jun. 6, 2011, the entire disclosure of which is incorporated by reference herein.

FIELD

This application relates generally to a video creation device, video creation method and non-transitory computer-readable storage medium.

BACKGROUND

In the past, a CCD (Charge-Coupled Device) or a CMOS (Complementary Metal-Oxide Semiconductor) has been used as the imaging element of a digital camera and/or the like. The dynamic range of this kind of imaging element is narrow compared to the naked eye and silver halide film. Consequently, when a subject with stark differences in brightness is photographed with a conventional digital camera and/or the like, the problem arose that the background became white or the subject was completely black.

In order to resolve this problem, technology for obtaining high-dynamic-range (HDR) images is being developed. This technology can obtain a high-dynamic-range image by synthesizing a bright image shot with a long exposure time and a dark image shot with a short exposure time.

Recently, this technology is also being applied to video creation. For example, in Unexamined Japanese Patent Application KOKAI Publication No. 2007-274285, an invention is disclosed in which high-dynamic-range video is obtained using a light-reduction device that causes the intensity of light reaching the imaging element to periodically change.

However, with the above-described technology, not only is the special mechanism of a light-reduction device necessary, but when the view angle changes during capture or when the subject moves, synthesis blurring occurs, creating the problem that it is difficult to obtain high-quality high-dynamic-range video.

Consequently, technology is being sought that can create high-quality high-dynamic-range video even when the capture view angle changes or the subject moves, without providing a special mechanism.

SUMMARY

In consideration of the foregoing, it is an object of the present invention to make it possible to create high-quality high-dynamic-range video.

To achieve the above object, the imaging device of the present invention comprises:

a successive creator for successively and alternately creating, through imaging, a frame of a first type and a frame of a second type, wherein a frame of the second type have a shorter exposure than the frame of the first type;

a difference determiner for determining whether or not the difference between frames of a determination pair exceeds a prescribed threshold, wherein the determination pair contains two frames of the first type next to each other in imaging timing, or the frame of the first type and the frame of the second type next to each other in imaging timing;

a frame creator for creating, when the difference determiner determines the difference exceeds the threshold, a frame of a third type between frames of a data pair in imaging timing based on the frames of the data pair, wherein the data pair contains two frames of the first type next to each other in imaging time and at least one frame is contained in the determination pair;

a synthesizer for creating high-dynamic-range frame by successively synthesizing frames of synthesized pair, wherein synthesized pair contains the frame of the second type and the frame of the first type next to the frame of the second type in imaging timing, or the frame of the second type and the frame of the third type next to the frame of the second type in imaging timing; and, a video creator for creating video comprised of the frame synthesized by the synthesizer.

In addition, to achieve the above object the video creation method of the present invention comprises:

a successive creation step for successively and alternately creating, through imaging, a frame of a first type and a frame of a second type, wherein a frame of the second type have a shorter exposure than the frame of the first type;

a determination step for determining whether or not the difference between frames of a determination pair exceeds a prescribed threshold, wherein the determination pair contains two frames of the first type next to each other in imaging timing, or the frame of the first type and the frame of the second type next to each other in imaging timing;

a frame creation step for creating, when the result of the determination in the determination step is a determination that the difference exceeds the threshold, a frame of a third type between frames of a data pair in imaging timing based on the frames of the data pair, wherein the data pair contains two frames of the first type next to each other in imaging time and at least one frame is contained in the determination pair;

a synthesizing step for creating high-dynamic-range frame by successively synthesizing frames of synthesized pair, wherein synthesized pair contains the frame of the second type and the frame of the first type next to the frame of the second type in imaging timing, or the frame of the second type and the frame of the third type next to the frame of the second type in imaging timing; and, a video creation step for creating video comprised of the frame synthesized by the synthesizer.

In addition, to achieve the above object the non-transitory computer-readable storage medium of the present invention is a non-transitory computer-readable storage medium on which is recorded a program executable by an electronic device having an imager, this program causing this electronic device to function as:

a successive creator for successively and alternately creating, through imaging, a frame of a first type and a frame of a second type, wherein a frame of the second type have a shorter exposure than the frame of the first type;

a difference determiner for determining whether or not the difference between frames of a determination pair exceeds a prescribed threshold, wherein the determination pair contains the frame of first type, and another frame of first type next to the frame of first type in imaging timing or frame of second type next to the frame of first type in imaging timing;

a frame creator for creating, when the difference determiner determines the difference exceeds the threshold, a frame of a third type between frames of a data pair in imaging timing based on the frames of the data pair, wherein the data pair contains two frames of the first type next to each other in imaging time and at least one frame is contained in the determination pair;

a synthesizer for creating high-dynamic-range frame by successively synthesizing frames of synthesized pair, wherein synthesized pair contains the frame of the second type and the frame of the first type next to the frame of the second type in imaging timing, or the frame of the second type and the frame of the third type next to the frame of the second type in imaging timing; and, a video creator for creating video comprised of the frame synthesized by the synthesizer.

BRIEF DESCRIPTION OF THE DRAWINGS

A more complete understanding of this application can be obtained when the following detailed description is considered in conjunction with the following drawings, in which:

FIG. 5 is a flowchart for explaining a video creation process according to the embodiment.

DETAILED DESCRIPTION

Figure 1:
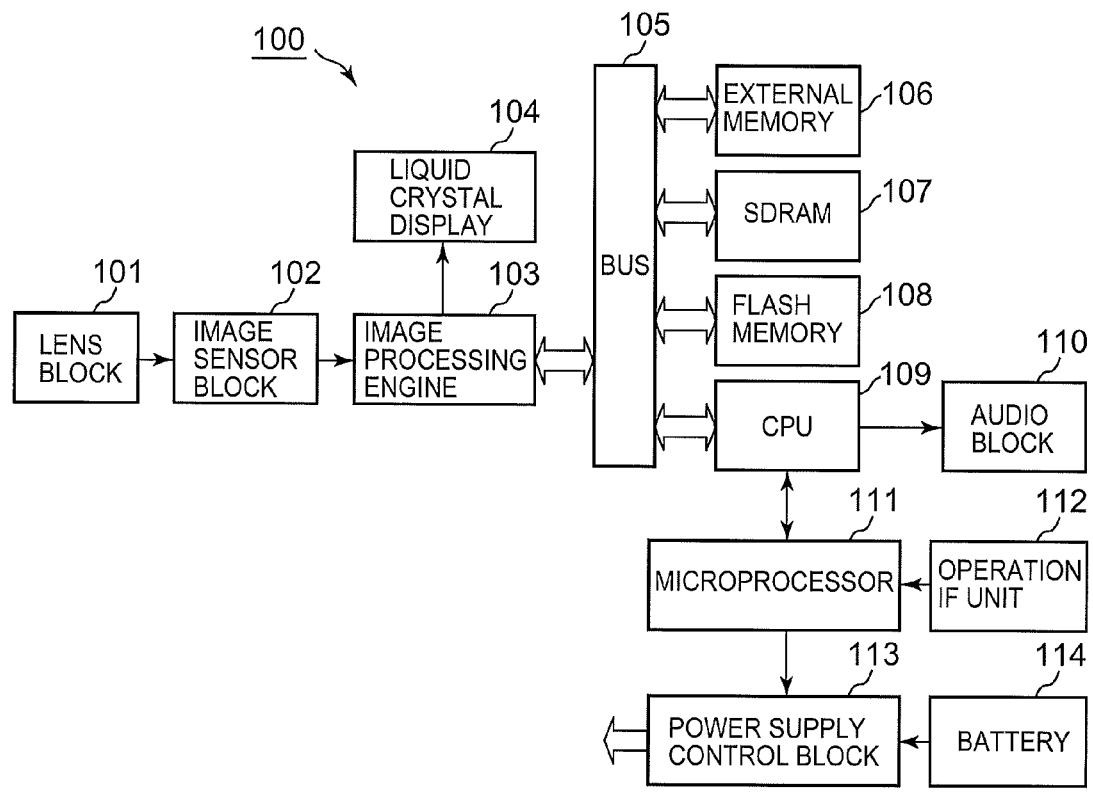
FIG. 1 is a block diagram showing the composition of a digital camera according to an embodiment of the present invention.

The embodiment of the present invention is described below with reference to the drawings. In this preferred embodiment, a case wherein the present invention is realized through a digital camera capable of capturing video (hereafter, digital camera 100) will be presented as an example. As shown in FIG. 1, the digital camera 100 according to this preferred embodiment is provided with a lens block 101, an image sensor block 102, an image processing engine 103, a liquid crystal display 104, a bus 105, an external memory 106, an SDRAM 107, a flash memory 108, a CPU 109, an audio block 110, a microprocessor 111, an operation IF unit 112, a power supply control block 113 and a battery 114.

The lens block 101 comprises an optical system such as a zoom lens, a focus lens and/or the like, and a drive mechanism (motor, actuator and/or the like) for driving this optical system. The lens block 101 condenses incident light through the optical system controlled by the drive mechanism and also adjusts the optical elements related to focal distance, aperture stop, view angle, focus, exposure and/or the like.

The image sensor block 102 comprises an imaging element such as a CCD (Charge Coupled Device), a CMOS (Complementary Metal Oxide Semiconductor) and/or the like, and a driver circuit (vertical/horizontal control circuit and/or the like) for driving this imaging element. The image sensor block 102 is positioned such that the light-receiving surface of the imaging element is on the optical axis of the lens block 101, so that an image of the subject (in other words, an optical image) is formed via the lens block 101. Furthermore, an imaging signal in accordance with the optical image is supplied to the image processing engine 103 under control by the driver circuit.

This image sensor block 102 can appropriately change the time during which electric charge is accumulated by the imaging element (exposure time) by controlling the charge transfer time. For example, in video imaging mode, frame (a image which complies the video) is successively created in which the exposure time is caused to change alternately between long and short.

Figure 2:
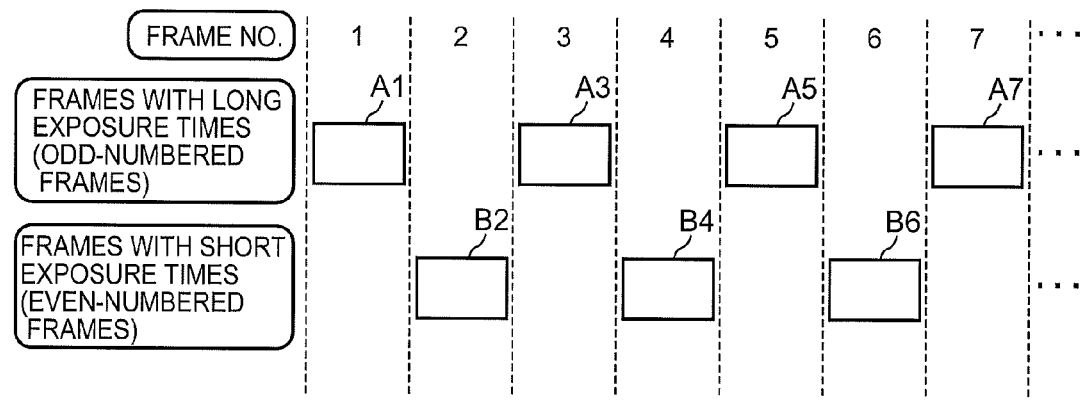
FIG. 2 is a schematic diagram for explaining the state of creating frames having differing exposure times.

Specifically, as shown in FIG. 2, in an odd-numbered lane, frames (including odd-numbered frames A1, A3, A5, A7, . . . ) with a long exposure is created as frames of a first type, and in an even-numbered lane, frames (including even-numbered frames B2, B4, B6, . . . ) with a short exposure is created as frames of a second type. Furthermore, the image sensor block 102 supplies the imaging signals (frame) successively created in this manner to the image processing image 103.

In FIG. 1, the image processing engine 103 is composed of an image processing circuit and/or the like, and processes imaging signals (frame) supplied from the image sensor block 102.

For example, the image processing engine 103 performs a process such as a pedestal clamp and/or the like on input imaging signals, and converts such into a luminosity (Y) signal and a color component (UV) signal and also accomplishes image processes for improving image quality such as auto white balance, contour emphasis and pixel interpolation. Furthermore, the image processing engine 103 successively supplies the converted YUV data to the SDRAM 107. In addition, in a mode in which the thru-image (finder image) is displayed, the data is converted to a video signal each time one frame of data is accumulated and is supplied to the liquid crystal display 104.

In addition, in video capture mode, the image processing engine 103 creates an interpolated frame when the image difference between frames exceeds a prescribed threshold value.

Figure 3:
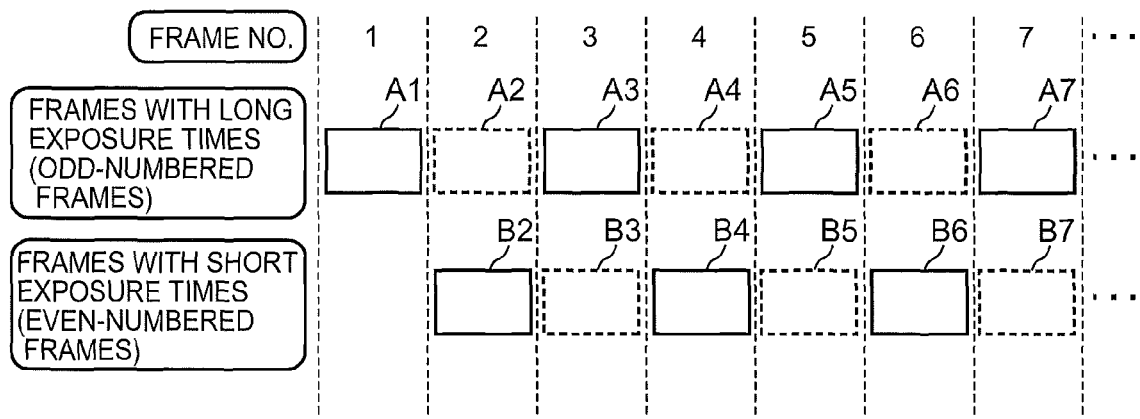
FIG. 3 is a schematic diagram for explaining the state of creating interpolated frames.

For example, when the change in imaging angle or displacement of the subject is large, the image processing image 103 creates interpolated frames (including frames A2, A4, A6, B3, B5, B7, . . . ) as frames of a third type, as shown in FIG. 3. To explain this specifically, when displacement by the subject is large (fast), the frame A1 and the frame B2 become different images. Consequently, the image processing engine 103 interpolates to create the interpolated frame A2 (a frame of third type) having a long exposure between the frame data A1 and the frame data A3 having long exposures.

Figure 4:
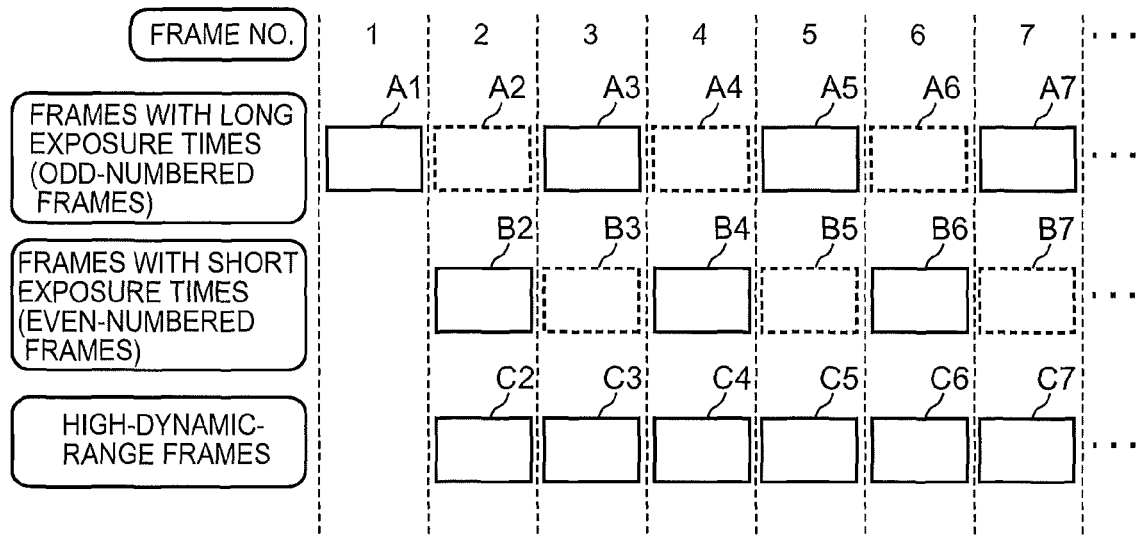
FIG. 4 is a schematic diagram for explaining the state of creating high-dynamic-range frames.

Furthermore, the image processing engine 103 synthesizes a frame with a long exposure and a frame with a short exposure and creates a high-dynamic-range frames (including frames C2, C3, C4, C5, C6, C7, . . . ), as shown in FIG. 4. To explain this specifically, when the subject's displacement is large (fast), the interpolated frame A2 having long exposure and the frame B2 having short exposure are synthesized to create a high-dynamic-range frame (HDRF) C2. On the other hand, when there is no (or little) displacement by the subject, an interpolated frame is not used, so the frame A1 having long exposure and the frame B2 having short exposure are synthesized to create frame C2 (high-dynamic-range frame, HDRF).

In addition, the image processing engine 103 accomplishes a contrast emphasis process and a saturation emphasis process for the high-dynamic-range synthesized frames created.

Returning to FIG. 1, the liquid crystal display 104 comprises an LCD (Liquid Crystal Display) panel and a drive circuit for such. The liquid crystal display 104 displays images that were captured and prescribed menu images and/or the like in accordance with video signals supplied form the image processing engine 103.

The bus 105 is a data path mutually linking the image processing engine 103, the external memory 106, the SRAM 107, the flash memory 108 and the CPU 109. Each type of data is sent and received via this bus 105.

The external memory 106 comprises a removable memory card and/or the like and can record image data that was captured. For example, image data compressed by the CPU 109 (still image files and video files in prescribed formats, and/or the like) is recorded on the external memory 106.

The SDRAM (Synchronous Dynamic Random Access Memory) 107 temporarily stores image data that was captured. For example, the SDRAM successively stores frames created by the image processing engine 103.

The flash memory 108 stores programs and data necessary for operation of the digital camera 100.

The CPU (Central Processing Unit) 109 controls each part of the digital camera 100. For example, in video capture mode, the CPU 109 reads a program stored in the flash memory 108 and executes the below-described video creation process. In other words, the CPU 109 controls the image processing engine 103 and/or the like as indicated below and creates a high-dynamic-range video.

First, the CPU 109 determines whether or not the difference in images between frames created by the image processing engine 103 exceeds a prescribed threshold value. As an example, the CPU 109 determines whether or not changes in specific image regions in the frame A1 and the frame A3 having long exposures in the above-described FIG. 2 exceed the threshold value.

Specifically, subjects in the view angle are compared with each other and a determination is made as to whether or not displacement exceeds a threshold value. As an example, when the subject is a person, the image of the person is specified through facial recognition and/or the like, the degree of displacement of that person in each frame is distinguished. And based on the distinguished degree of displacement, a determination is made as to whether or not that displacement exceeds a threshold value.

Specifically, the position where the face of a given person is (coordinates in that frame) is extracted through facial recognition for each frame. Furthermore, when the difference in extracted positions is greater than a prescribed threshold, a determination is made that the displacement exceeds the threshold. In the determination, if multiple people can be simultaneously recognized, the displacement of each person is specified and a determination is made as to any of the displacement exceed the threshold. This kind of method of determining the displacement of a person and/or the like is an example, and it would be fine to determine displacement through another method.

For example, the coordinates and size of a region (facial region) occupied by the face is obtained through facial recognition for one piece of frame (for example, long exposure frame). Furthermore, using the facial region and the corresponding region (with the same coordinates and size) in the other frame (for example, short exposure frame), a coefficient indicating the difference in images in the region (for example, the sum of squared difference (SSD) of the pixel values) is computed. Furthermore, when the computed coefficient is greater than a prescribed threshold value, the determination may be made that there was displacement exceeding the threshold. Furthermore, in a preset important region (for example, a prescribed region in the center of the screen), a coefficient (SSD and/or the like) indicating the difference between images in the region is computed and when the computed coefficient is greater than a prescribed threshold value, a determination may be made that there was displacement exceeding the threshold. As a coefficient indicating the difference between images, besides SSD it would be fine to use SAD (sum of absolute difference), NCC (normalized cross-correlation) and/or the like.

In addition, it would be fine to not distinguish changes in a specific image region in this manner but rather to determine changes in the image as a whole. For example, image regions as a whole in the view angle could be compared and a determination made as to whether or not there was displacement exceeding the threshold. Specifically, a coefficient (SSD, SAD, NCC and/or the like) indicating the difference between images in the image as a whole could be computed, and when the computed coefficient is greater than a prescribed threshold value, it may be determined that there was displacement exceeding the threshold.

In this case, when a determination is made that there is displacement exceeding the threshold, the CPU 109 controls the image processing engine 103 and causes an interpolated frame to be created. In other words, as shown in above-described FIG. 3, the image processing engine 103 is controlled to interpolated between the long exposure frame (for example, frame A1 and the frame A3), to create a frame of third type (for example, frame A2) based on the long exposure frame (for example, frame A1 and frame A3). The method of creating the interpolated frame can use arbitrary, commonly known frame interpolation technology such as a method for specifying pixel values in the interpolated frame (for example, the frame A2) by adding and averaging the pixels values in the frame that is to be interpolated (for example, the frame A1 and the frame A3), or a method for specifying the subject images between the frame A1 and the frame A3 using a block matching method or the Bezier interpolation method, and/or the like.

Furthermore, the CPU 109 controls the image processing engine 103 to create HDRF through high dynamic range imaging. In other words, as shown in above-described FIG. 4, the CPU 109 controls, when the subject's displacement is large, the image processing engine 103 to synthesize the interpolated frame (for example, frame A2) having long exposure and the frame (for example, frame B2) having short exposure and to create the high-dynamic-range synthesized frame (for example, frame C2). When the subject's displacement is not large, the interpolated frame is not used, so the frame of first type (for example, frame A1) having long exposure and the frame of second type (for example, frame B2) having short exposure are synthesized without change to create the HDRF C2.

The CPU 109 creates a video file from the HDRF created in this manner. In other words, after the contrast emphasis process and the saturation emphasis process are performed on the created HDRF, frame spacing is compressed, and a video file in a prescribed format is created and stored in the external memory 106.

The audio block 110 comprises an audio processing circuit and/or the like and processes audio data. For example, when the video file stored in the external memory 106 is played back, the audio block 110 decompresses the compressed audio data and outputs this audio via an unrepresented speaker and/or the like.

The microprocessor 111 comprises a single-chip microprocessor and/or the like and conveys to the CPU 109 instructions and/or the like in accordance with input from the operation IF unit 112. In addition, the microprocessor 111 controls the power supply control block 113 and causes necessary power to be supplied to each component.

The operation IF (Interface) unit 112 has various types of switches and keys appropriately arranged thereon and receives operation from a user. For example, the operation IF unit 112 includes a power switch, a mode selection key, a shutter key, a zoom key and/or the like. Furthermore, when any (or in some cases, multiple) of these is operated (pressed and/or the like) by a user, an operation signal in accordance with the operation contents thereof is supplied to the microprocessor 111. For example, when the video capture mode is selected through the mode selection key, that operation signal is supplied to the microprocessor 111. The shutter key has a so-called half-finder function capable of being half-pressed or fully pressed.

The power supply control block 113 is controlled by the microprocessor 111 and supplies power from the battery 114 to each component.

The battery 114 is composed of a rechargeable battery (lithium ion battery, nickel-hydride battery and/or the like) and supplies power to each component via the power supply control block 113.

The action of the digital camera 100 having this composition is described below. Here, a video creation process executed by the digital camera 100 in the video capture mode is described with reference to FIG. 5. FIG. 5 is a flowchart showing the flow of the video creation process. This video creation process is started for example when the operation IF unit 112 is operated by the user and the video capture mode is selected.

When the video capture mode is selected, the digital camera 100 successively creates frame data with the exposure time changing, alternating long and short (step S201). That is to say, the image sensor block 102 creates frames of the first type with long exposures (frames A1, A3, A5, A7, . . . ) in odd frame numbers and creates frames of second type with short exposures (frames B2, B4, B6, . . . ) in even frames, as shown in above-described FIG. 2.

The digital camera 100 determines whether or not the difference in images in the created frame exceeds a prescribed threshold (step S202). That is to say, the CPU 109 determines, for example, whether or not the index of difference (for example, SSD) in a specific image region between frames exceeds the threshold value. As an example, the CPU 109 determines whether or not the change in a specific image region in the frame A1 and the frame A3 having long exposures in the above-described FIG. 2 exceeds the threshold value. As described above, it would also be fine for the determination to be whether or not the index of difference in the image as a whole in the frame A1 and the frame A3 exceeds the threshold value.

When the determination is that the difference does not exceed the threshold (step S202: No), the digital camera 100 proceeds to the process in below-described step S204.

On the other hand, when it is determined that the difference exceeds the threshold (step S202: Yes), the digital camera 100 creates an interpolated frame (step S203). That is to say, the image processing engine 103 creates interpolated frame (frames A2, A4, A6, B3, B5, B7, . . . ) as shown in above-described FIG. 3. As an example, when displacement of the subject is large, the frame A1 and the frame B2 become different images. Consequently, the image processing engine 103 interpolates and creates the frame A2 having long exposure from the frame A1 and the frame A3 having long exposures.

The digital camera 100 creates HDRF (step S204). That is to say, the image processing engine 103 creates the HDRF by synthesizing frame with long exposure and frame with short exposure. As an example, when displacement of the subject is large, the image processing engine 103 creates the HDRF C2 by synthesizing the interpolated frame A2 having long exposure and the frame B2 having short exposure, as shown in above-described FIG. 4. On the other hand, displacement of subject is small or there is no displacement of the subject, the image processing engine 103 creates the HDRF C2 by synthesizing without change the frame A1 having long exposure and the frame B2 having short exposure.

The digital camera 100 creates a video file from the HDRF (step S205). That is to say, the CPU 109 creates a video file in a prescribed format from the HDRF created in this manner. In other words, after performing a contrast emphasis process and a saturation emphasis process on the created HDRF, frame spacing is compressed and a video file is created and stored in the external memory 106.

Through this kind of video creation process, the difference in images between frame is determined, appropriate frames of long exposure and frames of long exposure are synthesized and a dynamic range video is created. Consequently, it is possible to create a high-quality, high-dynamic-range video even when the capture view angle changes or the subject moves, without providing a special mechanism.

As noted above, with this preferred embodiment, it is possible to create a high-quality, high-dynamic-range video.

When realizing a photography device (video creation device) such as the digital camera 100 that exemplified the present invention in the above-described preferred embodiment, it is possible to provide the composition and functions of the present invention as a photography device prepared in advance. And it is also possible to cause an existing photography device to function as the photography device according to the present invention by applying a program that realizes the same functions as the CPU 109 and/or the like.

In addition, with the above-described preferred embodiment, a pair of frames with long exposures (long exposure pair), the frames being next to each other is compared, out of the image data successively acquired, and a determination is made as to whether or not the difference is greater than a prescribed threshold value. However, this is intended to be illustrative and not limiting, for a composition is also possible in which the difference is determined by comparing a determination pair including frames with a long exposure (for example, frame data A3) and frame data with a short exposure (for example, frame data B4 to frame data A3), the frames being next to each other, in the capture timing. In this case, the HDRF is created by synthesizing the long exposure frame that is the subject of determination and the long exposure frame with short exposure data interposed in between. For example, when the determination pair has the frame A3 and the frame B4, the HDRF data is created from the frame A3 and the frame A5.

With the above-described preferred embodiment, a digital camera having a video capture function was presented as an example of an imaging device, but this aspect of the imaging device is arbitrary, and it is possible to realize this with a stand-alone digital video camera or digital still camera, and the present invention may also be applied to various types of electronic equipment (for example, cell phones and/or the like) provided with imaging functions similar to this.

In such a case, it is possible to cause an existing device to function as the imaging device according to the present invention by applying a program.

The method of applying this kind of program is arbitrary, and application can be by storing on a recording medium such as a CD-ROM or memory card, for example, and can also be via a communication medium such as the Internet, for example.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A video creation device comprising:
   a successive creator for successively and alternately creating, through imaging, a frame of a first type and a frame of a second type, wherein a frame of the second type has a shorter exposure than the frame of the first type;
   a difference determiner for determining whether or not a difference between frames of a determination pair exceeds a prescribed threshold, wherein the determination pair contains two frames of the first type next to each other in imaging timing, or the frame of the first type and the frame of the second type next to each other in imaging timing;
   a frame creator for creating, when the difference determiner determines that the difference exceeds the prescribed threshold, a frame of a third type between frames of a data pair in imaging timing based on the frames of the data pair, wherein the data pair contains two frames of the first type next to each other in imaging timing, or two frames of the second type next to each other in imaging timing;
   a synthesizer for creating high-dynamic-range frames by (i) successively synthesizing the successively and alternately created frame data of the first type and frame data of the second type when the difference determiner determines that the difference does not exceed the prescribed threshold, and (ii) successively synthesizing respective successive frame data of the third type and frame data of one of the first and second types when the difference determiner determines that the difference does exceed the prescribed threshold;
   a video creator for creating video from the high-dynamic-range frames synthesized by the synthesizer.

2. The video creation device of claim 1, wherein the determiner determines whether or not the difference exceeds the prescribed threshold for a specific image region in the frames of the determination pair.

3. The video creation device of claim 2, further comprising:
   a face recognizer; and
   an image determiner for determining whether or not a person's image is included in the frame of first type or the frame of second type created by the successive creator through the face recognizer;
   wherein, the difference determiner determines, when the image determiner determines that the person's image is included, whether or not the difference exceeds the prescribed threshold, using the person's image as the specific image region.

4. The video creation device of claim 1, wherein the difference determiner determines whether or not the difference exceeds the prescribed threshold with respect to a whole of the images in the frames of determination pair.

5. The video creation device of claim 1, further comprising a first processor for accomplishing a contrast emphasis process on the high-dynamic-range frames synthesized by the synthesizer.

6. The video creation device of claim 1, further comprising a second processor for accomplishing a saturation emphasis process on the high-dynamic-range frames synthesized by the synthesizer.

7. A video creation method for a video creation device comprising a CPU, said method comprising operating the CPU of the video creation device to perform functions of:
   successively and alternately creating, through imaging, a frame of a first type and a frame of a second type, wherein a frame of the second type has a shorter exposure than the frame of the first type;
   determining whether or not a difference between frames of a determination pair exceeds a prescribed threshold, wherein the determination pair contains two frames of the first type next to each other in imaging timing, or the frame of the first type and the frame of the second type next to each other in imaging timing;
   creating, when the difference exceeds the prescribed threshold, a frame of a third type between frames of a data pair in imaging timing based on the frames of the data pair, wherein the data pair contains two frames of the first type next to each other in imaging timing, or two frames of the second type next to each other in imaging timing;
   creating high-dynamic-range frames by (i) successively synthesizing the successively and alternately created frame data of the first type and frame data of the second type when the difference does not exceed the prescribed threshold, and (ii) successively synthesizing respective successive frame data of the third type and frame data of one of the first and second types when the difference does exceed the prescribed threshold;
   creating video from the high-dynamic-range frames.

8. A non-transitory computer-readable storage medium on which is recorded a program executable by an electronic device having an imager, said program causing said electronic device to function as:
   a successive creator for successively and alternately creating, through imaging, a frame of a first type and a frame of a second type, wherein a frame of the second type has a shorter exposure than the frame of the first type;
   a difference determiner for determining whether or not a difference between frames of a determination pair exceeds a prescribed threshold, wherein the determination pair contains two frames of the first type next to each other in imaging timing, or the frame of the first type and the frame of the second type next to each other in imaging timing;
   a frame creator for creating, when the difference determiner determines that the difference exceeds the prescribed threshold, a frame of a third type between frames of a data pair in imaging timing based on the frames of the data pair, wherein the data pair contains two frames of the first type next to each other in imaging timing, or two frames of the second type next to each other in imaging timing;
   a synthesizer for creating high-dynamic-range frames by (i) successively synthesizing the successively and alternately created frame data of the first type and frame data of the second type when the difference determiner determines that the difference does not exceed the prescribed threshold, and (ii) successively synthesizing respective successive frame data of the third type and frame data of one of the first and second types when the difference determiner determines that the difference does exceed the prescribed threshold;
   a video creator for creating video from the high-dynamic-range frames synthesized by the synthesizer.

* * * * *